(12) United States Patent
Ramesh et al.

(10) Patent No.: US 7,005,473 B2
(45) Date of Patent: *Feb. 28, 2006

(54) POLYMERIC PIGMENT DISPERSANT UTILIZED AS A GRIND RESIN FOR PIGMENTS IN SOLVENTBORNE PIGMENT DISPERSIONS AND METHOD OF PREPARING THE SAME

(75) Inventors: Swaminathan Ramesh, Canton, MI (US); Paul Harris, West Bloomfield, MI (US)

(73) Assignee: BASF Corporation, Southfield, MI (US)

( * ) Notice: Subject to any disclaimer, the term of this patent is extended or adjusted under 35 U.S.C. 154(b) by 605 days.

This patent is subject to a terminal disclaimer.

(21) Appl. No.: 10/122,509

(22) Filed: Apr. 16, 2002

(65) Prior Publication Data

US 2002/0156230 A1    Oct. 24, 2002

Related U.S. Application Data

(63) Continuation-in-part of application No. 09/747,474, filed on Dec. 22, 2000.

(51) Int. Cl.
    *C08K 3/00*    (2006.01)
(52) U.S. Cl. .......................... 524/602; 528/69; 528/85; 525/450
(58) Field of Classification Search ................ 524/602; 525/450; 528/69, 85
    See application file for complete search history.

(56) References Cited

U.S. PATENT DOCUMENTS

| | | | |
|---|---|---|---|
| 4,224,080 A | 9/1980 | Chambers et al. |
| 4,311,622 A | 1/1982 | Buter |
| 4,839,406 A | 6/1989 | Nagura et al. |
| 4,851,294 A | 7/1989 | Buter et al. |
| 4,859,743 A | 8/1989 | Ambrose et al. |
| 5,378,762 A | 1/1995 | Czornij et al. |
| 5,605,965 A | 2/1997 | Rehfuss et al. |
| 5,665,433 A | 9/1997 | Moussa et al. |
| 5,786,420 A | 7/1998 | Grandhee |
| 5,969,048 A | 10/1999 | Ito et al. |
| 5,976,701 A | 11/1999 | Barancyk et al. |
| 5,994,479 A | 11/1999 | Green et al. |
| 6,080,825 A | 6/2000 | Ohrbom et al. |
| 6,111,001 A | 8/2000 | Barancyk et al. |
| 6,291,073 B1 | 9/2001 | Ohrbom et al. |
| 6,376,596 B1 | 4/2002 | Barsotti et al. |
| 6,432,544 B1 | 8/2002 | Stewart et al. |
| 6,462,144 B1 | 10/2002 | Ramesh et al. |
| 6,515,192 B1 | 2/2003 | Rink et al. |
| 6,569,956 B1 | 5/2003 | Ramesh |
| 6,646,049 B1 | 11/2003 | Ramesh |
| 6,649,705 B1 | 11/2003 | Ramesh |
| 2003/0009052 A1 | 1/2003 | Ramesh et al. |
| 2003/0050432 A1 | 3/2003 | Ramesh et al. |

FOREIGN PATENT DOCUMENTS

| | | |
|---|---|---|
| DE | 19940855 | 3/2001 |
| EP | 767226 | 9/1996 |
| GB | 1108261 | 4/1963 |
| WO | WO9935198 | 7/1999 |
| WO | WO0018516 | 4/2000 |

OTHER PUBLICATIONS

Brenner 1995, pp. 176-177, Hyperbranched polymers: modification with flexible chains.
Kim, p. 61,, Progress in hyperbranched, polymers.
Heeringa et al., pp. 201-223.
Rink et al., U.S. Appl. No. 10/049,607** Feb. 14, 2002, (IN-5553), pp1-108.

*Primary Examiner*—Edward J. Cain

(57) ABSTRACT

The present invention is directed to a polyester polycarbamate polymeric pigment dispersant to be used as a grind resin to incorporate pigment into pigment dispersions for coating compositions. The pigment dispersant is the reaction product of a first compound having a plurality of hydroxyl groups, a carboxylic acid anhydride, a second compound having at least one epoxy group, and a carbamate compound. The present invention is also directed to a method of preparing the pigment dispersant.

45 Claims, No Drawings

POLYMERIC PIGMENT DISPERSANT UTILIZED AS A GRIND RESIN FOR PIGMENTS IN SOLVENTBORNE PIGMENT DISPERSIONS AND METHOD OF PREPARING THE SAME

RELATED APPLICATIONS

This is a continuation-in-part of co-pending U.S. patent application Ser. No. 09/747,474 which was filed on Dec. 22, 2000.

FIELD OF THE INVENTION

The subject invention generally relates to a pigment dispersion utilized in solventborne coating compositions. More specifically, the subject invention relates to a polymeric pigment dispersant for a pigment and a method of preparing the polymeric pigment dispersant.

BACKGROUND OF THE INVENTION

Solventborne coating compositions typically include a primary binder resin, a crosslinker, a pigment or pigments to improve the aesthetics of the coating composition, and other coating additives such as solvents, flow and appearance control agents, fillers such as extender pigment, and the like.

It is understood in the art that the pigment is incorporated into the solventborne coating compositions via a pigment dispersion. The pigment dispersion is derived from dispersion of the pigment into a grind resin. More specifically, a mill, such as a ball mill, grind mill, or continuous mill, is utilized to incorporate the pigment into the grind resin. The mill integrates the pigment into the grind resin until a desired particle size of the pigment is achieved, and until the pigment is appropriately wetted by the grind resin and uniformly dispersed throughout the grind resin.

The grind resins of the prior art including, but not limited to, polyacrylic-based resins, have proven to be inadequate for use as a grind resin for dispersing pigment usable in solventborne coating compositions. The grind resins of the prior art are ineffective because these resins are unable to withstand mechanical forces exerted by the mill when integrating the pigment. These grind resins are also deficient in wetting the pigment and in maintaining the pigment dispersed throughout the grind resin. Instead, with the grind resins of the prior art, such as the polyacrylic-based resins, the pigment tends to coagulate or settle resulting in poor stability and inadequate 'shelf life' of the pigment dispersion.

Furthermore, it is known in the art that the insufficient resistance to mechanical forces, the insufficient wetting, and the coagulation and/or settling as described above lead to poor color travel in solventborne coating compositions. The poor color travel associated with solventborne coating compositions contributes to color matching problems between solventborne and waterborne coating compositions. For example, with a phthalocyanine-based blue pigment, a waterborne coating composition is redder at the 'flop' viewing angle and greener at the 'face' viewing angle relative to the color of the same phthalocyanine-based blue pigment in a solventborne coating composition. In other words, the waterborne coating composition with such a pigment has much larger color travel relative to the solventborne coating composition with the same pigment. This difference in the amount of color travel between waterborne and solventborne coating compositions is particularly troublesome for vehicle assembly plants that utilize waterborne coating compositions as primary body paints and solventborne coating compositions as repair and/or bumper paints. Consequently, excessive 'tinting' or color modification takes place with both waterborne and solventborne coating compositions.

These prior art grind resins also tend to have increased viscosities and, as understood in the art, increased viscosities typically inhibit the amount of pigment that can be incorporated into the grind resin. As a result, pigment dispersions that utilize the grind resins of the prior art cannot attain sufficient pigment-to-binder ratios while maintaining acceptable gloss and appearance in a film of the coating compositions. Also, due to the increased viscosity, these grind resins often require additional solvent and other additives which increases the overall volatile content of the pigment dispersion—a characteristic that is undesirable throughout the coating industry.

In sum, the prior art grind resins, as detailed above, are characterized by one or more inadequacy. Due to the inadequacies identified in the prior art, it is desirable to provide a novel polymeric pigment dispersant to be utilized as a grind resin for pigments and a method of preparing the polymeric pigment dispersant. It is advantageous that the polymeric pigment dispersant according to the subject invention effectively wets pigment, uniformly disperses pigment, and provides increased pigment-to-binder ratios accompanied with acceptable color, gloss, and appearance in the film of the coating composition.

SUMMARY OF THE INVENTION

A polymeric pigment dispersant is disclosed. The polymeric pigment dispersant of the subject invention, a polyester polycarbamate, is utilized as a grind resin to incorporate pigment into a pigment dispersion for solventborne coating compositions. This polymeric pigment dispersant is the reaction product of a first compound having a plurality of hydroxyl groups, a carboxylic acid anhydride, a second compound having at least one epoxy group, and a carbamate compound.

A method of preparing the polymeric pigment dispersant is also disclosed. According to this method, the hydroxyl groups of a branched compound are reacted, or polymerized, with the carboxylic acid anhydride to form a first intermediate compound having a plurality of carboxylic acid groups. Once the first intermediate compound is formed, at least one of the carboxylic acid groups of the first intermediate compound is reacted with the second compound having the at least one epoxy group to form a second intermediate compound having at least one hydroxyl group. The carbamate compound is then reacted with the at least one hydroxyl group of the second intermediate compound to prepare the polymeric pigment dispersant of the subject invention.

The general object of the subject invention is to develop a grind resin that effectively wets pigments used in solventborne coating compositions and that is capable of resisting mechanical forces introduced by the mills that are used to grind and integrate the pigments into the grind resin. In resisting the mechanical forces exerted by the mills, this grind resin is ideal in that it provides sufficient time for the mill to achieve the ideal particle size of the pigment. Consequently, solventborne coating compositions having good color travel can be developed to match the color travel of corresponding waterborne coating compositions.

It is a further object of the subject invention to develop a grind resin that has a relatively low molecular weight and a correspondingly low viscosity such that increased pigment-to-binder ratios can be achieved while maintaining a low viscosity for the pigment dispersion. More specifically, as a result of the relatively low viscosity of the grind resin of the subject invention, higher concentrations of pigments can be incorporated into the grind resin to attain the increased pigment-to-binder ratios of the pigment dispersion. Due to the higher concentration of pigment, a solid, into the grind resin, the volatile content of the pigment dispersion, and of the overall coating composition, is decreased. Also, even at the increased pigment-to-binder ratios, this grind resin demonstrates superior dispersion stability through extended shelf life of the pigment dispersion. This grind resin is also suitable for achieving optimal appearance characteristics, such as distinctiveness and gloss, in a film of the coating composition.

DETAILED DESCRIPTION OF THE INVENTION

The polymeric pigment dispersant of the subject invention, a polyester polycarbamate, is utilized as a grind resin to incorporate pigment into a pigment dispersion for solventborne coating compositions. Preferably, the polymeric pigment dispersant is utilized as a grind resin to incorporate organic pigments into the pigment dispersion. Examples of organic pigments that are utilized in solventborne coating compositions include, among other organic pigments, phthalocyanine-based green pigment, phthalocyanine-based blue pigment, and the like. The polymeric pigment dispersant of the subject invention may also be utilized as a grind resin to incorporate inorganic pigments, known throughout the art, into the pigment dispersion. It is to be understood that the terms polymeric pigment dispersant and grind resin will be used interchangeably throughout the subject application. The polymeric pigment dispersant includes a highly-branched organic structure having various functionalities including, but not limited to, branched hydrocarbon functionality, hydroxyl functionality, carboxylate functionality, carbamate functionality, and ester functionality. These various functionalities promote efficient wetting of the pigment and optimal stability of the pigment in the grind resin of the pigment dispersion in the solventborne coating composition and are described below.

In a preferred embodiment, the polymeric pigment dispersant is generally the reaction product of a first compound having a plurality of hydroxyl groups, a carboxylic acid anhydride, a second compound having at least one epoxy group, and a carbamate compound. In the preferred embodiment, the first compound is a branched compound having a plurality of hydroxyl groups. In an alternative embodiment, which is described below, the polymeric pigment dispersant is the reaction product of the first compound having the plurality of hydroxyl groups, the carboxylic acid anhydride, the second compound having the at least one epoxy group, the carbamate compound, and an acid compound having at least two hydroxyl groups. In this alternative embodiment, the acid compound and the first compound are reacted to form the branched compound.

The method of preparing the polymeric pigment dispersant includes the steps of providing the branched compound having the plurality of hydroxyl groups, reacting by polymerizing the hydroxyl groups of the branched compound with the carboxylic acid anhydride to form a first intermediate compound having a plurality of carboxylic acid groups, and then reacting at least one of the carboxylic acid groups of the first intermediate compound with the epoxy group of the second compound to form a second intermediate compound having at least one hydroxyl group. The at least one hydroxyl group of the second intermediate compound is then reacted with the carbamate compound to prepare the polymeric pigment dispersant. The method steps of the subject invention are preferably conducted at temperatures between 50° C. and 200° C., more preferably between 100° C. and 175° C. This method will be described in further detail below.

To prepare the polymeric pigment dispersant, the first compound is selected to maximize the number of hydroxyl groups, i.e., the hydroxyl functionality, in the first compound while establishing a foundation for the highly-branched organic structure of the polymeric pigment dispersant. As such, the first compound may alternatively be described as a branched compound having a plurality of hydroxyl groups. The branched compound is also described below in an alternative embodiment of the subject invention. The hydroxyl groups of the first compound can be primary, secondary, and tertiary hydroxyl groups. Preferably, the first compound is present in the polymeric pigment dispersant in an amount from 1 to 20, more preferably from 2 to 10, parts by weight based on 100 parts by weight of the polymeric pigment dispersant.

The first compound is more specifically selected from the group consisting of erythritol, pentaerythritol, dipentaerythritol, trimethylolethane, trimethylolpropane, dulcitol, threitol, and mixtures thereof. As understood by those skilled in the art, trimethylolethane and trimethylolpropane each provide three hydroxyl groups, erythritol and threitol each provide four hydroxyl groups, and dipentaerythritol and dulcitol each provide six hydroxyl groups. In the preferred embodiment of the subject invention, the first compound comprises pentaerythritol. For descriptive purposes, a chemical representation of pentaerythritol is disclosed below.

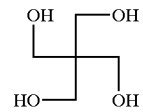

As shown above, pentaerythritol is a compound having a central carbon atom and four peripheral carbon atoms each providing a hydroxyl group for a total of four hydroxyl groups.

In view of the above characteristics of the first compound, other equivalent compounds include, but are not limited to, ethylene glycol and propylene glycol, which each provide two hydroxyl groups, and glycerol, which provides three hydroxyl groups. Other alcohols, sugars, and acids providing a plurality of hydroxyl groups are also suitable as the first compound.

The carboxylic acid anhydride that is polymerized with the first compound is selected to maximize the number of carboxylic acid groups, i.e., the acid functionality, that can be formed in the first intermediate compound and also to contribute to the highly-branched organic structure of the polymeric pigment dispersant. The carboxylic acid anhydride may be either an aromatic or non-aromatic cyclic anhydride. The carboxylic acid anhydride is preferably selected from, but not limited to, the group consisting of maleic anhydride, hexahydrophthalic anhydride, methylhexahydrophthalic anhydride, tetrahydrophthalic anhydride, phthalic anhydride, succinic anhydride, dodecenylsuccinic anhydride, trimellitic anhydride, and mixtures thereof. In the preferred embodiment of the subject invention, the carboxylic acid anhydride comprises hexahydrophthalic anhydride. For descriptive purposes, a chemical representation of hexahydrophthalic anhydride is disclosed below.

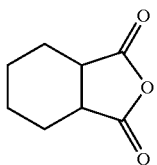

As shown above, the hexahydrophthalic anhydride provides an acid functionality whereby one carboxylic acid group can be formed into the intermediate compound per mole of the carboxylic acid anhydride introduced.

The carboxylic acid anhydride is present in the polymeric pigment dispersant in an amount from 20 to 40, preferably from 23 to 35, parts by weight based on 100 parts by weight of the polymeric pigment dispersant. Also, the molar ratio of the carboxylic acid anhydride to the first compound present in the polymeric pigment dispersant is from 2:1 to 20:1. More specifically, in the preferred embodiment, the molar ratio of the carboxylic acid anhydride, hexahydrophthalic anhydride, that is reacted with the first compound, pentaerythritol, is 4:1. That is, four moles of hexahydrophthalic anhydride are reacted with one mole of pentaerythritol to form the first intermediate compound. For descriptive purposes, a chemical representation of the first intermediate compound formed by the reaction of one mole pentaerythritol and four moles of hexahydrophthalic anhydride is disclosed below.

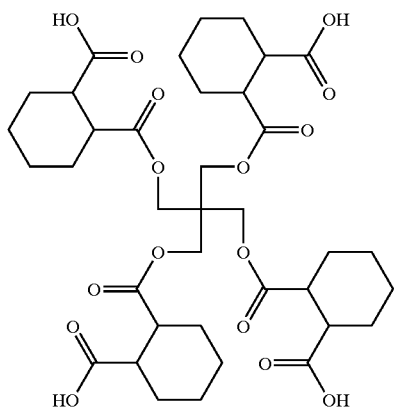

As shown above, the first intermediate compound that is formed with the reactants of the preferred embodiment is a tetracarboxylic acid compound, i.e., a compound including four carboxylic acid groups or an acid functionality of four. These four carboxylic acid groups of the first intermediate compound are formed when the anhydride rings of the four moles of hexahydrophthalic anhydride open forming ester linkages with the pentaerythritol, and the hydrogen atoms from the four hydroxyl groups of the pentaerythritol react with the oxygen atoms originally from the anhydride rings of the four moles of hexahydrophthalic anhydride thereby forming the tetracarboxylic acid intermediate compound according to the preferred embodiment. As stated above, the intermediate compound of the preferred embodiment has an acid functionality of four. Of course, it is to be understood that the acid functionality can decrease or increase depending upon the selection of the particular first compound and of the particular carboxylic acid anhydride, and upon the equivalent weight ratios between the first compound and the carboxylic anhydride.

The chemical representation of the first intermediate compound disclosed above is merely illustrative of the subject invention. The intermediate compound disclosed above has a four-branch organic structure originally derived from the organic structure of the pentaerythritol. It is to be understood that if an alternative first compound is selected, such as dipentaerythritol which, as discussed above, provides six hydroxyl groups, then the intermediate compound would have a six-branch organic structure derived from the structure of the dipentaerythritol. Of course, six moles of hexahydrophthalic anhydride then would be selected to react with the six hydroxyl groups of the dipentaerythritol.

To prepare the polymeric pigment dispersant of the subject invention, at least one of the carboxylic acid groups of the first intermediate compound is reacted with the second compound to form the second intermediate compound having the at least one hydroxyl group. More specifically, it is the epoxy group of the second compound that reacts with at least one of the carboxylic acid groups of the first intermediate compound to form the second intermediate compound having the at least one hydroxyl group. Preferably, all of the carboxylic acid groups of the first intermediate compound are reacted with the second compound such that the second intermediate compound is formed with a plurality of hydroxyl groups. For descriptive purposes only, the subject invention is described below in terms of the preferred embodiment where the second intermediate compound includes the plurality of hydroxyl groups.

The second compound is selected to include at least one epoxy group, and is present in the polymeric pigment dispersant in an amount from 35 to 55, preferably from 38 to 52, parts by weight based on 100 parts by weight of the polymeric pigment dispersant. The second compound is further selected to include from 6 to 20, preferably from 10 to 15, carbon atoms such that the miscibility between the polymeric pigment dispersant, including the second compound, and a binder resin of the solventborne coating composition is maximized. As such, the second compound is selected from the group consisting of glycidylneodecanoate, dodecyl oxide, tetradecyl oxide, octadecyl oxide, and cyclohexene oxide, and mixtures thereof. In view of the above characteristics of the second compound, other equivalent compounds include, but are not limited to, epoxy-containing aromatic hydrocarbons such as bisphenol A monoglycidyl ether.

In the preferred embodiment of the subject invention, the second compound comprises glycidylneodecanoate. As is known in the art, glycidylneodecanoate is commercially available from Miller-Stephenson Chemical Company, Inc. under its CARDURA® product line, as CARDURA E 10S. For descriptive purposes, a chemical representation of glycidylneodecanoate is disclosed below.

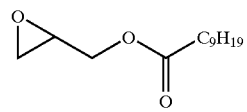

As shown above, glycidylneodecanoate includes one epoxy group. Preferably, four moles of glycidylneodecanoate are reacted with the four carboxylic acid groups of the first intermediate compound such that one epoxy group reacts with each carboxylic acid group. As described above, it is the epoxy group of the second compound that reacts with at least one of the carboxylic acid groups of the first intermediate compound. More specifically, the epoxy ring of the glycidylneodecanoate opens such that one of the two carbon atoms, originally in the epoxy ring of the glycidylneodecanoate, reacts and bonds with an oxygen atom from one of the hydroxyls of the carboxylic acid groups of the first intermediate compound. It is to be understood that in the reaction, the epoxy ring can open in one of two manners such that either one of the carbon atoms of the epoxy ring reacts and bonds with the oxygen atom from the hydroxyl of the carboxylic acid group. In one manner, the second intermediate compound includes a primary hydroxyl, and in a second manner, the second intermediate compound includes a secondary hydroxyl. The two manners of epoxy ring opening are represented below in the alternative forms of the second intermediate compound. First, the second intermediate compound with primary hydroxyl groups is disclosed.

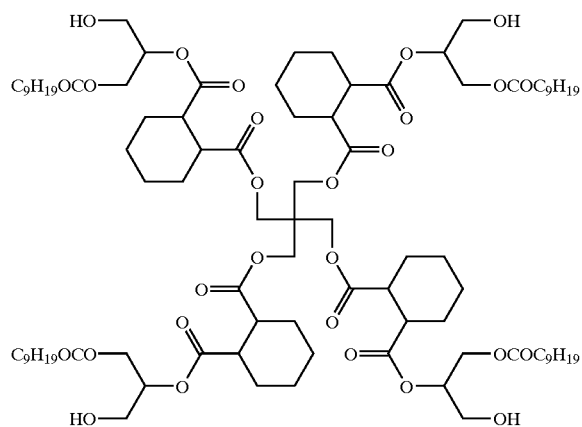

Next, the second intermediate compound with secondary hydroxyl groups is disclosed.

Next, the hydroxyl groups of the second intermediate compound are reacted with the carbamate compound to prepare the polymeric pigment dispersant. The carbamate compound is further defined as an alkyl carbamate having 1 to 20 carbon atoms in the alkyl chain. For example, the carbamate compound may be generically defined as

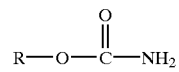

where R is an alkyl chain having from 1 to 20 carbon atoms. Preferably, the carbamate compound is selected from the group consisting of methyl carbamate, ethyl carbamate, and mixtures thereof. The most preferred carbamate compound comprises methyl carbamate [$CH_3OC(O)NH_2$]. Other carbamate compounds include, but are not limited to, butyl carbamate, propylene glycol monocarbamate, and the like. The carbamate compound is present in the polymeric pigment dispersant in an amount from 5 to 30, preferably from 15 to 25, parts by weight based on 100 parts by weight of the polymeric pigment dispersant. Also, the molar ratio of the carbamate compound to the first compound present in the polymeric pigment dispersant is from 1:1 to 10:1. As indicated above, the number of hydroxyl groups in the first compound functions as a foundation for the branched organic structure of the polymeric pigment dispersant. As such, the total number of moles of the carbamate compound is generally equal to the number of hydroxyl groups in the first compound. Therefore, in the preferred embodiment, the molar ratio of the carbamate compound, methyl carbamate, to the first compound, pentaerythritol, is 4:1 because pentaerythritol has four hydroxyl groups. If the first compound is dipentaerythritol having six hydroxyl groups, then preferably six moles of the carbamate compound are utilized to prepare the completed polymeric pigment dispersant. Of course, structures resulting from lower equivalents of the carbamate compound are not to be excluded. For instance, as a non-limiting example, if the first compound is dipentaerythritol, having the six hydroxyl groups, and only four moles of the carbamate compound are utilized, then the completed polymeric pigment dispersant will have both

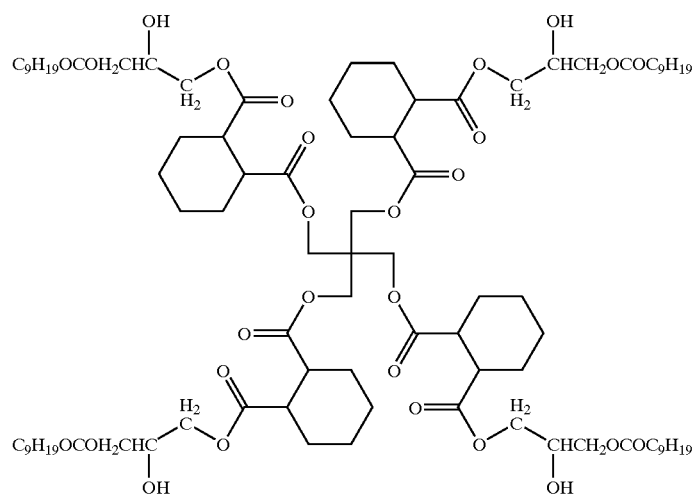

carbamate and hydroxyl functional groups remaining. A chemical representation of the completed polymeric pigment dispersant of the preferred embodiment is disclosed below.

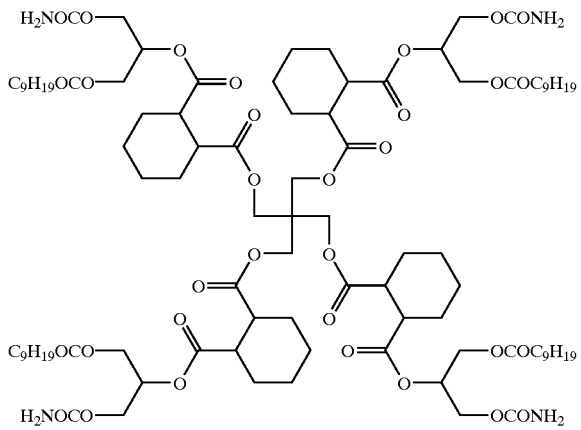

As shown above in the completed polymeric pigment dispersant, the carbamate compound, methyl carbamate, has reacted with the primary hydroxyls of the second intermediate compound that result from the particular manner of epoxy ring opening of the glycidylneodecanoate. As such, primary carbamate groups are present.

The carbamate compound can also react with the secondary hydroxyls of the second intermediate compound that result from a second manner of epoxy ring opening of the glycidylneodecanoate. As such, secondary carbamate groups are present. A chemical representation of the alternative form of the completed polymeric pigment dispersant is disclosed below.

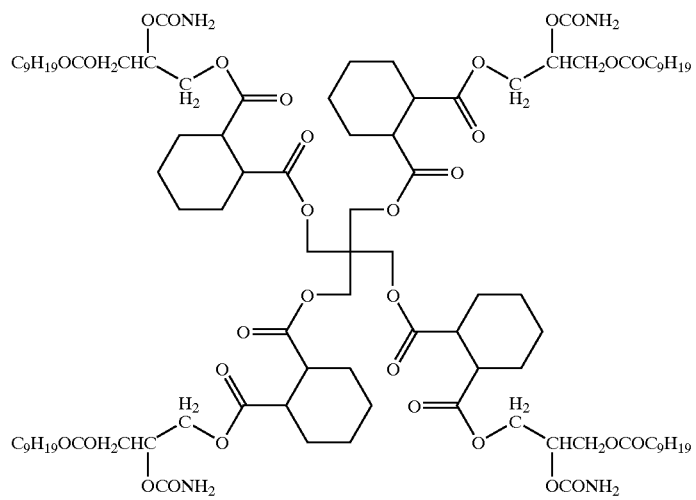

It is to be understood that the alternative form of the completed polymeric pigment dispersant disclosed above is difficult to prepare since the secondary hydroxyls of the second intermediate compound can only be trans-carbamated using more rigorous preparation conditions including, but not limited to, the use of catalysts, longer preparation time, and higher preparation temperatures.

As shown above in either of the embodiments, the polymeric pigment dispersant is a polyester polycarbamate, preferably a polyester tetracarbamate, having a four-branch organic structure.

Of course, in terms of the preferred embodiment, after the four moles of methyl carbamate react with the hydroxyl groups of the second intermediate compound to prepare the polymeric pigment dispersant, four moles of methanol are produced as a side product. The number of moles of methanol that are produced as a side product vary depending on the number of moles of the carbamate compound, preferably the methyl carbamate, that are reacted with the second intermediate compound.

The polymeric pigment dispersant may alternatively be defined by the following general formula:

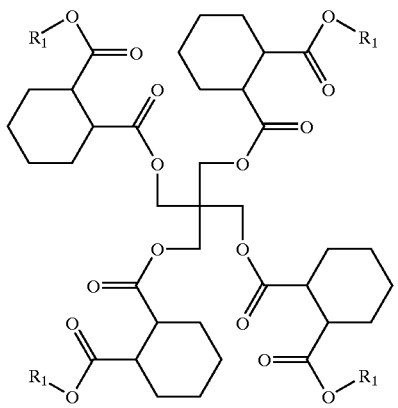

In this representation of the polymeric pigment dispersant according to the subject invention, $R_1$ is selected from the group consisting of;

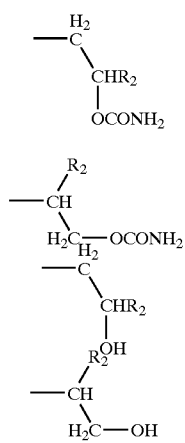

(i)

(ii)

(iii)

(iv)

, and mixtures thereof. $R_2$ is an alkoxy chain having at least one oxygen atom and from 6 to 20 carbon atoms. In the preferred embodiment where the completed polymeric pigment dispersant is, in part, derived from glycidylneodecanoate, $R_2$ is $CH_2OCOC_9H_{19}$. All of the structural chemical representations disclosed above include a four-branch organic structure dependent on the first compound being pentaerythritol or some other compound that provides four hydroxyl groups. However, the polymeric pigment dispersant of the preferred embodiment need not be limited to pentaerythritol.

In an alternative embodiment of the subject invention, the polymeric pigment dispersant may further comprise the reaction product of an acid compound having at least two hydroxyl groups. In this alternative embodiment, the acid compound reacts with the first compound to form the branched compound having the plurality of hydroxyl groups. More specifically, the first compound, which is selected from the group consisting of erythritol, pentaerythritol, dipentaerythritol, trimethylolethane, trimethylolpropane, dulcitol, threitol, and mixtures thereof, is reacted with the acid compound to provide the branched compound having the plurality of hydroxyl groups. The primary objective of including such an acid compound, i.e., an acid compound with hydroxyl functionality, is to increase the branching in the organic structure of the polymeric pigment dispersant to prepare a hyperbranched polyester polycarbamate.

If included in the polymeric pigment dispersant, the acid compound is present in an amount from 5 to 25, preferably from 10 to 20, parts by weight based on 100 parts by weight of the polymeric pigment dispersant. More specifically, the acid compound is selected from the group consisting of dihydroxy acid compounds, trihydroxy acid compounds, and mixtures thereof. Preferably, the acid compound comprises dimethylolpropionic acid (DMPA). For descriptive purposes, a chemical representation of DMPA is disclosed below.

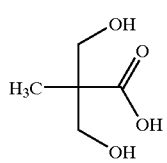

To provide the branched compound, the number of moles of the acid compound that are used is generally equal to the number of hydroxyl groups provided by the first compound. Therefore, in terms of the preferred first compound, pentaerythritol, with four hydroxyl groups, four moles of DMPA would be reacted to provide the branched compound. For descriptive purposes, a chemical representation of the branched compound in this alternative embodiment, where the pentaerythritol is reacted with DMPA is disclosed below.

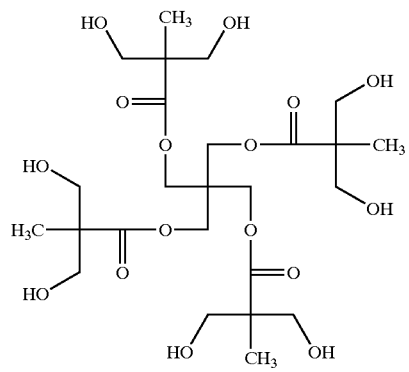

Next, the hydroxyl groups of the branched compound are reacted with the carboxylic acid anhydride. That is, the hydroxyl groups of the branched compound are reacted with the carboxylic acid anhydride to form the first intermediate compound having the plurality of carboxylic acid groups. The description set forth above with respect to the carboxylic acid anhydride is also applicable in this alternative embodiment. As such, it is preferred that the carboxylic acid anhydride comprises hexahydrophthalic anhydride. For descriptive purposes, a chemical representation of the first intermediate compound in this alternative embodiment is disclosed below.

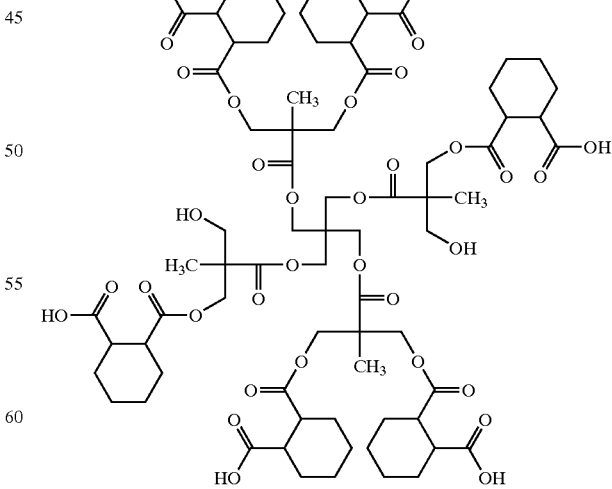

To form the first intermediate compound illustrated above, one mole of pentaerythritol, four moles of DMPA, and six moles of hexahydrophthalic anhydride were reacted.

Next, at least one of the carboxylic acid groups of the first intermediate compound are reacted with the second compound having the at least one epoxy group. More specifically, it is the epoxy group of the second compound that reacts with at least one of the carboxylic acid groups of the first intermediate compound. Preferably, all of the carboxylic acid groups of the first intermediate compound are reacted with the second compound. This reaction forms the second intermediate compound having the plurality of hydroxyl groups. The description set forth above with respect to the second compound is also applicable in this alternative embodiment. As such, it is preferred that the second compound comprises glycidylneodecanoate. For descriptive purposes, a chemical representation of the second intermediate compound formed by reacting six moles of glycidylneodecanoate with the first intermediate compound is disclosed below.

Next, the hydroxyl groups of the second intermediate compound are reacted with the carbamate compound to prepare the polymeric pigment dispersant of this alternative embodiment. The description set forth above with respect to the carbamate compound is also applicable in this alternative embodiment. As such, it is preferred that the carbamate compound comprises methyl carbamate. In this alternative embodiment, the total number of moles of the carbamate compound is generally equal to the number of hydroxyl groups in the second intermediate compound such that all of the hydroxyl groups are reacted. In the event the total number of moles of the carbamate compound is less than the number of hydroxyl groups in the second intermediate compound, some of the hydroxyl groups will remain unreacted and the completed dispersant will have both hydroxyl

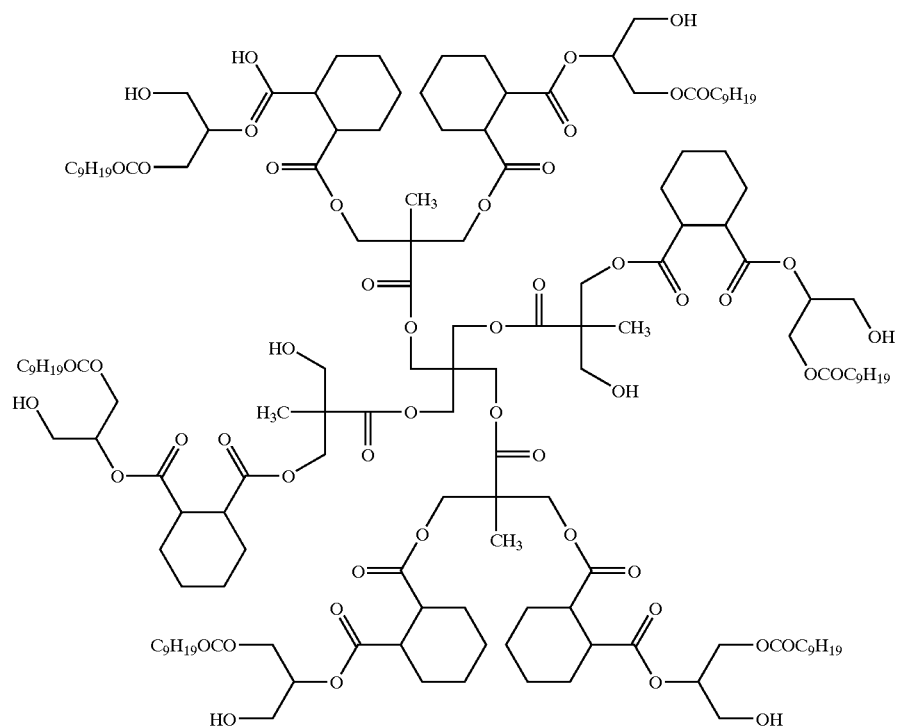

The above chemical representation for the second intermediate compound discloses primary hydroxyl groups. Of course, it is to be understood that, although not shown, the epoxy ring of the second compound may open such that the second intermediate compound includes secondary hydroxyl groups.

and carbamate functionality. In the illustrated embodiment, six moles of methyl carbamate are reacted with the hydroxyl groups of the second intermediate compound. For descriptive purposes, a chemical representation of the polymeric pigment dispersant of this alternative embodiment is disclosed below.

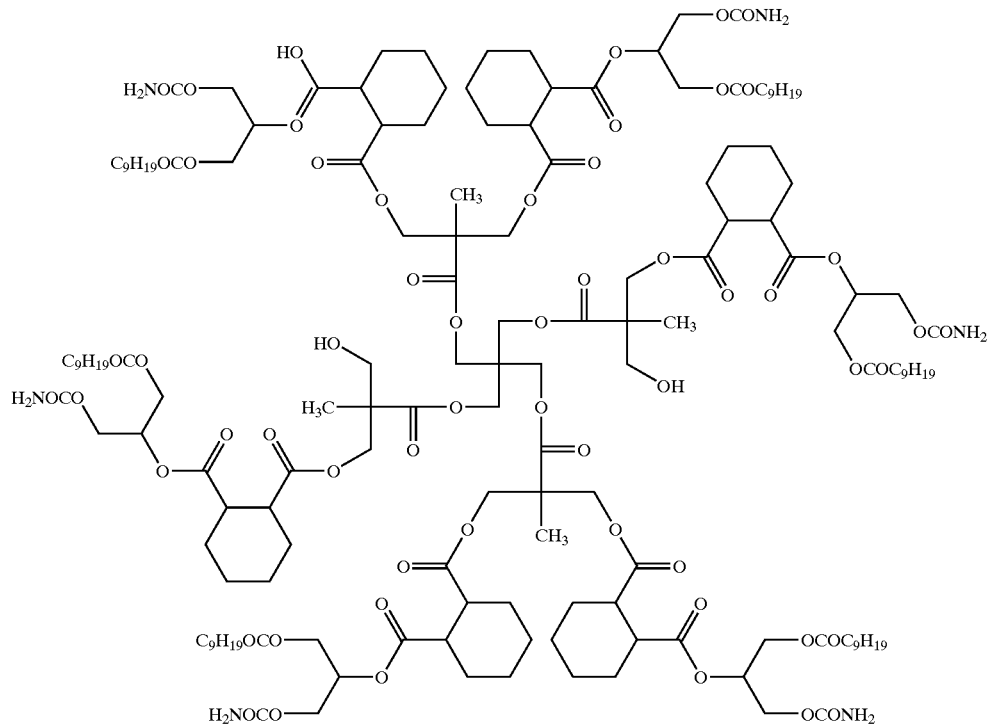

The polymeric pigment dispersant of the subject invention has a weight-average molecular weight, $M_w$, of 4000 or less. Preferably, the molecular weight is from 500 to 3000, and more preferably, from 900 to 2200. Additionally, the polymeric pigment dispersant of the subject invention has a non-volatile content of from 60 to 80, preferably from 65 to 75, percent non-volatile by weight.

Pigment dispersions utilizing this polymeric pigment dispersant generally have pigment-to-binder ratios of 10 to 30, preferably from 12 to 25. In terms of the amount of the pigment present in these pigment dispersions, the pigment is present in an amount from 2 to 30, preferably from 5 to 20, and most preferably from 7 to 15, parts by weight based on 100 parts by weight of the pigment dispersion. In terms of the amount of the polymeric pigment dispersant present in these pigment dispersion, the polymeric pigment dispersant is present in an amount from 40 to 80, preferably from 45 to 70, and most preferably from 50 to 65, parts by weight based on 100 parts by weight of the pigment dispersion.

The pigment particles in these dispersions have a particle size of less than six microns upon grinding/milling. That is, the grind resin of the subject invention is robust enough to permit the pigments dispersed within to be ground or milled long enough to achieve pigment particle sizes of less than six microns without degradation and coagulation of the grind resin. Furthermore, pigment dispersions utilizing this polymeric pigment dispersant have viscosities of less than 80 Krebs units. The viscosities of these pigment dispersions were measured after grinding preparation or after a shaker preparation as described below.

As understood by those skilled in the art, the pigment dispersions utilizing the polymeric pigment dispersant of the subject invention may include other components including, but not limited to, additives (flow and appearance), solvents, extender pigments, surfactants, etc.

The resulting structure of the completed polymeric pigment dispersant of the subject invention essentially 'anchors' the pigment in the pigment dispersion thereby maintaining the pigment uniformly dispersed throughout the grind resin. More specifically, the functionalities of the completed polymeric pigment dispersant physically interact with the active centers inherent in pigments by complex or coordinated covalent bonding. With organic pigments, the functionalities of the dispersant interact with the double bonds or aromatic structures present in the active centers of the organic pigments, and with inorganic pigments, the functionalities of the dispersant interact with the metals present in the active centers of the inorganic pigments. This physical interaction keeps the pigment uniformly dispersed throughout the grind resin. Also, as discussed above, the hydrocarbon chain on the completed polymeric pigment dispersant that is derived from the glycidylneodecanoate, which contains from 6 to 20 carbon atoms, promotes thorough miscibility between the polymeric pigment dispersant and the binder resin of the solventborne coating composition.

It is to be understood that all of the preceding chemical representations are merely two-dimensional chemical representations and that the structure of these chemical representations may be other than as indicated.

The following examples illustrating the formation of and the use of the polymeric pigment dispersant of the subject invention, as presented herein, are intended to illustrate and not limit the invention.

EXAMPLE 1

In Example 1, the polyester polycarbamate polymeric pigment dispersant was prepared by adding and reacting the following parts, by weight, unless otherwise indicated.

TABLE 1

| Reactant | Amount (moles) | Amount (grams) | Weight (%) |
|---|---|---|---|
| pentaerythritol [PE] | 1.0 | 136.0 | 6.6 |
| hexahydrophthalic anhydride [HHPA] | 4.0 | 616.0 | 29.7 |
| glycidylneodecanoate [CARDURA E 10S] | 4.0 | 992.0 | 47.8 |
| methyl carbamate | 4.4 | 330.0 | 15.9 |
| TOTAL | — | 2074.0 | 100.0 |

Per the above table, Table 1, 616.0 grams of HHPA were added in a reaction flask to 136.0 grams of PE, i.e., the branched compound, to form the first intermediate compound. The reaction flask, including the PE and HHPA, was heated with a conventional heat supply to a temperature of 120° C. to 125° C., when an exotherm was observed, peaking at approximately 150° to 160° C. After this exotherm, the batch was allowed to cool and was maintained at 140° C. for approximately one hour. Standard titration for acid number revealed that the reaction to form the first intermediate compound was complete (290 to 302 mg KOH/gram). The completeness of the reaction between the PE and HHPA was also monitored with IR Spectroscopy noting the disappearance of an anhydride peak. The reaction mixture was cooled to 120° C. and 992.0 grams of CARDURA E 10S were added to the first intermediate compound to form a second intermediate compound. Another exotherm was observed, peaking at approximately 150° C. At this point, the reaction was maintained at 140° C. until standard titration for acid number revealed that the reaction to form the second intermediate compound was complete (<4 mg KOH/gram). The completeness of this reaction was also monitored with IR Spectroscopy noting the disappearance of an epoxide peak. The second intermediate compound had a hydroxyl number of 126 to 130 mg KOH/gram. The second intermediate compound was then reacted with 330.0 grams of methyl carbamate and 2 grams of dibutyltin oxide (DBTO) in 300 grams of toluene such that trans-carbamation took place at 125 to 130° C. with the azeotropic removal of methanol as the side product. This reaction formed the polymeric pigment dispersant. The end of the reaction to form the polymeric pigment dispersant was determined by titrating for the hydroxyl number (<13 mg KOH/gram/non-volatile(NV)). Excess methyl carbamate was removed by vacuum stripping and then the polymeric pigment dispersant was dissolved in aromatic 100 solvent to a final NV of 70% by weight. The completed polymeric pigment dispersant was a polyester tetracarbamate having an equivalent weight of 520 to 540 grams/carbamate/NV.

EXAMPLE 2

In Example 2, the polyester polycarbamate polymeric pigment dispersant was prepared by adding and reacting the following parts, by weight, unless otherwise indicated.

TABLE 2

| Reactant | Amount (moles) | Amount (grams) | Weight (%) |
|---|---|---|---|
| pentaerythritol [PE] | 1.0 | 136.0 | 3.7 |
| dimethylolpropionic acid [DMPA] | 4.0 | 536.0 | 14.6 |
| hexahydrophthalic anhydride [HHPA] | 6.0 | 924.0 | 25.1 |
| glycidylneodecanoate [CARDURA E 10S] | 6.0 | 1488.0 | 40.4 |
| methyl carbamate | 8.0 | 600.0 | 16.2 |
| TOTAL | — | 3684.0 | 100.0 |

Per the above table, Table 2, 536.0 grams DMPA were added in a reaction flask to 136.0 grams of PE to form the branched compound. 0.2 grams of $H_2SO_4$ were used to catalyze this reaction. The reaction flask, including the PE and DMPA, was heated with a conventional heat supply to a temperature of 120° C. and then to 160° C. Condensation took place and 72 grams of water were removed, with about the last 10 grams of water removed under vacuum. 924.0 grams of HHPA were then added to the branched compound to form the first intermediate compound upon heating to 125° C. The reaction mixture of the first intermediate compound exothermed to 150° to 160° C. After this exotherm, the batch was allowed to cool and was maintained at 140° C. for approximately one hour. Standard titration for acid number revealed that the reaction to form the first intermediate compound was complete (215 to 225 mg KOH/gram). The completeness of the reaction between the HHPA and the branched compound was also monitored with IR Spectroscopy noting the disappearance of an anhydride peak. The reaction mixture was cooled to 120° C. and 1488.0 grams of CARDURA E 10S were added to the first intermediate compound to form a second intermediate compound. Another exotherm was observed, peaking at approximately 150° C. At this point, the reaction was maintained at 140° C. until standard titration for acid number revealed that the reaction to form the second intermediate compound was complete (<4 mg KOH/gram). The completeness of this reaction was also monitored with IR Spectroscopy noting the disappearance of an epoxide peak. The second intermediate compound had a hydroxyl number of 146 to 154 mg KOH/gram. The second intermediate compound was then reacted with 600.0 grams of methyl carbamate and 2 grams of dibutyltin oxide (DBTO) in 400 grams of toluene such that trans-carbamation took place at 125 to 130° C. with the azeotropic removal of methanol as the side product. This reaction formed the polymeric pigment dispersant. The end of the reaction to form the polymeric pigment dispersant was determined by titrating for the hydroxyl number (<15 mg KOH/gram/non-volatile(NV)). Excess methyl carbamate was removed by vacuum stripping and then the product was dissolved in aromatic 100 solvent to a final NV of 70%. The completed polymeric pigment dispersant, a hyperbranched (octa) polyester polycarbamate, had an equivalent weight of 450 to 464 grams/carbamate/NV.

EXAMPLE 3

In Example 3, the polyester polycarbamate polymeric pigment dispersant was prepared by adding and reacting the following parts, by weight, unless otherwise indicated.

TABLE 3

| Reactant | Amount (moles) | Amount (grams) | Weight (%) |
| --- | --- | --- | --- |
| pentaerythritol [PE] | 1.0 | 136.0 | 4.1 |
| dimethylolpropionic acid [DMPA] | 4.0 | 536.0 | 16.3 |
| hexahydrophthalic anhydride [HHPA] | 5.0 | 770.0 | 23.5 |
| glycidylneodecanoate [CARDURA E 10S] | 5.0 | 1240.0 | 37.8 |
| methyl carbamate | 8.0 | 600.0 | 18.3 |
| TOTAL | — | 3282.0 | 100.0 |

Per the above table, Table 3, 536.0 grams DMPA were added in a reaction flask to 136.0 grams of PE to form the branched compound. 0.2 grams of $H_2SO_4$ were used to catalyze this reaction. The reaction flask, including the PE and DMPA, was heated with a conventional heat supply to a temperature of 120° C. and then to 160° C. Condensation took place and 72 grams of water were removed, with about the last 10 grams of water removed under vacuum. 770.0 grams of HHPA were then added to the branched compound to form the first intermediate compound upon heating to 125° C. The reaction mixture of the first intermediate compound exothermed to 150° to 160° C. After this exotherm, the batch was allowed to cool and was maintained at 140° C. for approximately one hour. Standard titration for acid number revealed that the reaction to form the first intermediate compound was complete (200 to 206 mg KOH/gram). The completeness of the reaction between the HHPA and the branched compound was also monitored with IR Spectroscopy noting the disappearance of an anhydride peak. The reaction mixture was cooled to 120° C. and 1240.0 grams of CARDURA E 10S were added to the first intermediate compound to form a second intermediate compound. Another exotherm was observed, peaking at approximately 150° C. At this point, the reaction was maintained at 140° C. until standard titration for acid number revealed that the reaction to form the second intermediate compound was complete (<4 mg KOH/gram). The completeness of this reaction was also monitored with IR Spectroscopy noting the disappearance of an epoxide peak. The second intermediate compound had a hydroxyl number of 170 to 176 mg KOH/gram. The second intermediate compound was then reacted with 600.0 grams of methyl carbamate and 2 grams of dibutyltin oxide (DBTO) in 400 grams of toluene such that trans-carbamation took place at 125 to 130° C. with the azeotropic removal of methanol as the side product. This reaction formed the polymeric pigment dispersant. The end of the reaction to form the polymeric pigment dispersant was determined by titrating for the hydroxyl number (<16 mg KOH/gram/non-volatile(NV)). Excess methyl carbamate was removed by vacuum stripping and then the product was dissolved in aromatic 100 solvent to a final NV of 70% by weight. The completed polymeric pigment dispersant, a hyperbranched (octa) polyester polycarbamate, had an equivalent weight of 400 to 408 grams/carbamate/NV.

EXAMPLES 4 & 5

For Examples 4 and 5, the polyester polycarbamate polymeric pigment dispersant from Example 1 was incorporated into a modified pigment dispersion according to the following table, Table 4.

TABLE 4

| Pigment Dispersion Component (modified) | Example 4 Amount (grams) | Example 5 Amount (grams) | Other |
| --- | --- | --- | --- |
| POLYESTER POLYCARBAMATE POLYMERIC PIGMENT DISPERSANT [FROM EXAMPLE 1] | 64.0 | 51.0 | — |
| Solvent [n-butanol] | 5.3 | 0.0 | — |
| Solvent [oxo-hexyl acetate] | 17.2 | 12.3 | — |
| Solvent [n-butyl acetate] | 0.0 | 29.1 | — |
| Additive [Nuosperse 657] | 0.0 | 0.2 | — |
| Copper Phthalocyanine Blue Pigment [Hostaperm BT-728-D] | 0.0 | 7.4 | Added pigment gradually over time and under stirring |
| Copper Phthalocyanine Blue Pigment [Sunfast Blue 248-0615] | 13.5 | 0.0 | Added pigment gradually over time and under stirring |
| Viscosity (Original) | 66 Krebs units | 54 Krebs units | — |
| Viscosity (after stability) | 79 Krebs units | 57 Krebs units | Type- Hot Box Stability 140° F. x 4 days |
| Grind Check (Original) | 10 | 8 | |
| Grind Check (after stability) | 10 | 8 | Type- Hot Box Stability 140° F. x 4 days |
| Tint Strength vs. Control | 68.1 | 112.7 | Relative to control Tint Strength = 100 |

Per Table 4, for Example 4, 64.0 grams of the polyester polycarbamate polymeric pigment dispersant from Example 1, 5.3 grams of n-butanol, 17.2 grams of oxo-hexyl acetate, and 13.5 grams of a copper phthalocyanine blue pigment were added together to prepare a modified pigment dispersion for a solventborne coating composition. The copper phthalocyanine blue pigment used in Example 4 was Hostaperm BT-728-D, which is commercially available from Clariant. This example is termed a modified pigment dispersion, as opposed to a scaled-up pigment dispersion, because the pigment dispersion was prepared by shaking for 6 hours on Scandex shaking equipment (with 200 grams of glass beads) instead of being ground and/or milled. For Example 5, 51.0 grams of the polyester polycarbamate polymeric pigment dispersant from Example 1, 12.3 grams of oxo-hexyl acetate, 29.1 grams of n-butyl acetate, 0.2 grams of an additive, Nuosperse 657 which is commercially available from Condea Servo, and 7.4 grams of a copper phthalocyanine blue pigment were added together to prepare the modified pigment dispersion. The copper phthalocyanine blue pigment used in Example 5 was Sunfast Blue Pigment 248-0615, which is commercially available from Sun Chemical. As with Example 4, Example 5 was prepared by shaking for 6 hours on Scandex shaking equipment (with 200 grams of glass beads) instead of being ground and/or milled.

The stability of this modified pigment dispersion was evaluated relying on viscosity and grind checks before and after Hot Box Stability testing. The conditions for the Hot Box Stability testing are set forth above in Table. For both Examples 4 and 5, the grind check results, determined using a standard grind gauge method, were the same before and after the stability testing, and the viscosity differentials between the original viscosity and the viscosity, after stability, were evaluated at acceptable.

The Tint Strength was confirmed by adding 4.5 grams of the modified pigment dispersion for Example 4 (with the Copper Phthalocyanine Blue Pigment, Sunfast Blue 248-0615) grams of a conventional, solventborne white dispersion (TiO$_2$ pigment) to prepare a tint strength sample of Example 4. The tint strength sample of Example 4 was then sprayed versus a Control. The value of the Tint Strength for the Control and for the tint strength sample of Example 4 was measured in standard CIELAB color space. The value of the Control was set at 100, and the Tint Strength for Example 4, 68.1, was determined relative to the Control. The Control was prepared with 4.5 grams of a control pigment dispersion (acrylic-based dispersant), having the same pigment as Example 4, added to 150.0 grams of the same conventional, solventborne white dispersion (TiO$_2$ pigment).

For Example 5, the Tint Strength was confirmed in the same manner. 13.5 grams of the modified pigment dispersion for Example 5 (with the Copper Phthalocyanine Blue Pigment, Hostaperm BT-728-D) to 150.0 grams of the conventional, solventborne white dispersion (TiO$_2$ pigment) to prepare a tint strength sample of Example 5. The tint strength sample of Example 5 was then sprayed versus the Control. The value of the Tint Strength for the Control and for the tint strength sample of Example 5 was measured in standard CIELAB color space. The value of the Control was set at 100, and the Tint Strength for Example 5, 112.7, was determined relative to the Control. The Control was prepared with 13.5 grams of a control pigment dispersion (acrylic-based dispersant), having the same pigment as Example 5, added to 150.0 grams of the same conventional, solventborne white dispersion (TiO$_2$ pigment).

EXAMPLES 6 & 7

For Examples 6 and 7, the polyester polycarbamate polymeric pigment dispersant from Example 1 was incorporated into a scaled-up pigment dispersion according to the following table, Table 5.

TABLE 5

| Pigment Dispersion Component (scaled-up) | Example 6 Amount (grams) | Example 7 Amount (grams) | Other |
|---|---|---|---|
| POLYESTER POLYCARBAMATE POLYMERIC PIGMENT DISPERSANT [FROM EXAMPLE 1] | 64.0 | 51.0 | — |
| Solvent [n-butanol] | 5.3 | 0.0 | — |
| Solvent [oxo-hexyl acetate] | 17.2 | 12.3 | — |
| Solvent [n-butyl acetate] | 0.0 | 29.1 | — |
| Additive [Nuosperse 657] | 0.0 | 0.2 | — |
| Copper Phthalocyanine Blue Pigment [Hostaperm BT-728-D] | 0.0 | 7.4 | Added pigment gradually over time and under stirring |
| Copper Phthalocyanine Blue Pigment [Sunfast Blue 248-0615] | 13.5 | 0.0 | Added pigment gradually over time and under stirring |
| Viscosity (Original) | 78 Krebs units | 54 Krebs units | — |
| Viscosity (after stability) | — | — | Type-Hot Box Stability 140° F. × 4 days |
| Grind Check (Original) | <6 | <6 | |
| Grind Check (after stability) | — | — | Type-Hot Box Stability 140° F. × 4 days |
| Tint Strength vs. Control | 68.9 | 101.1 | Relative to control Tint Strength = 100 |

Per Table 5, for Example 6, 64.0 grams of the polyester polycarbamate polymeric pigment dispersant from Example 1, 5.3 grams of n-butanol, 17.2 grams of oxo-hexyl acetate, and 13.5 grams of a copper phthalocyanine blue pigment were added together to prepare a scaled-up pigment dispersion for a solventborne coating composition. The copper phthalocyanine blue pigment used in Example 6 was Hostaperm BT-728-D. This example is termed a scaled-up pigment dispersion, as opposed to a modified pigment dispersion, because the pigment dispersion was prepared by grinding for 90 minutes on an Eiger mill, instead of being shaken with glass beads. For Example 7, 51.0 grams of the polyester polycarbamate polymeric pigment dispersant from Example 1, 12.3 grams of oxo-hexyl acetate, 29.1 grams of n-butyl acetate, 0.2 grams of an additive, Nuosperse 657, and 7.4 grams of a copper phthalocyanine blue pigment were added together to prepare the modified pigment dispersion. The copper phthalocyanine blue pigment used in Example 7 was Sunfast Blue Pigment 248-0615. As with Example 6, Example 7 was prepared by grinding for 90 minutes on an Eiger mill, instead of being shaken with glass beads.

The viscosity of this scaled-up pigment dispersion was evaluated. For Examples 6 and 7, the original viscosity was 78 and 54 Krebs units, respectively. The grind check of this scaled-up pigment dispersion was also evaluated. For both Examples 6 and 7, the grind check results, determined using a standard grind gauge method, were less than six microns. That is, after the standard grind gauge method, no pigment particles were observed thereby indicating the pigment particle size is less than six microns.

The Tint Strength was confirmed by adding 4.0 grams of the scaled-up pigment dispersion for Example 6 (with the Copper Phthalocyanine Blue Pigment, Sunfast Blue 248-0615) to 150.0 grams of a conventional, solventborne white dispersion (TiO$_2$ pigment) to prepare a tint strength sample of Example 6. The tint strength sample of Example 6 was then sprayed versus a Control. The value of the Tint Strength for the Control and for the tint strength sample of Example 6 was measured in standard CIELAB color space. The value of the Control was set at 100, and the Tint Strength for Example 6, 68.9, was determined relative to the Control. The Control was prepared with 4.0 grams of a control pigment dispersion (acrylic-based dispersant), having the same pigment as Example 6, added to 150.0 grams of the same conventional, solventborne white dispersion (TiO$_2$ pigment).

For Example 7, the Tint Strength was confirmed in the same manner. 12.0 grams of the scaled-up pigment dispersion for Example 7 (with the Copper Phthalocyanine Blue Pigment, Hostaperm BT-728-D) to 150.0 grams of the conventional, solventborne white dispersion (TiO$_2$ pigment) to prepare a tint strength sample of Example 7. The tint strength sample of Example 7 was then sprayed versus the Control. The value of the Tint Strength for the Control and for the tint strength sample of Example 7 was measured in standard CIELAB color space. The value of the Control was set at 100, and the Tint Strength for Example 7, 101.1, was determined relative to the Control. The Control was prepared with 12.0 grams of a control pigment dispersion (acrylic-based dispersant), having the same pigment as Example 7, added to 150.0 grams of the same conventional, solventborne white dispersion (TiO$_2$ pigment).

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A polymeric pigment dispersant for efficient wetting and grinding of a pigment, said polymeric pigment dispersant comprising the reaction product of:
   a first compound having a plurality of hydroxyl groups;
   a carboxylic acid anhydride;
   a second compound having at least one epoxy group; and
   a carbamate compound.

2. A polymeric pigment dispersant as set forth in claim 1 wherein said first compound comprises pentaerythritol.

3. A polymeric pigment dispersant as set forth in claim 2 wherein said carboxylic acid anhydride comprises hexahydrophthalic anhydride.

4. A polymeric pigment dispersant as set forth in claim 3 wherein said second compound comprises glycidylneodecanoate.

5. A polymeric pigment dispersant as set forth in claim 4 wherein said carbamate compound comprises methyl carbamate.

6. A polymeric pigment dispersant as set forth in claim 5 further comprising the reaction product of an acid compound having at least two hydroxyl groups.

7. A polymeric pigment dispersant as set forth in claim 6 wherein said acid compound comprises dimethylolpropionic acid.

8. A polymeric pigment dispersant as set forth in claim 1 wherein said first compound is selected from the group consisting of erythritol, pentaerythritol, dipentaerythritol, trimethylolethane, trimethylolpropane, dulcitol, threitol, and mixtures thereof.

9. A polymeric pigment dispersant as set forth in claim 1 wherein said first compound is present in an amount from 1 to 20 parts by weight based on 100 parts by weight of said polymeric pigment dispersant.

10. A polymeric pigment dispersant as set forth in claim 1 wherein the molar ratio of said carboxylic acid anhydride to said first compound is from 2:1 to 20:1.

11. A polymeric pigment dispersant as set forth in claim 1 wherein said carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

12. A polymeric pigment dispersant as set forth in claim 1 wherein said carboxylic acid anhydride is present in an amount from 20 to 40 parts by weight based on 100 parts by weight of said polymeric pigment dispersant.

13. A polymeric pigment dispersant as set forth in claim 1 wherein said second compound has from 6 to 20 carbon atoms.

14. A polymeric pigment dispersant as set forth in claim 1 wherein said second compound is selected from the group consisting of glycidylneodecanoate, dodecyl oxide, tetradecyl oxide, octadecyl oxide, and cyclohexene oxide, and mixtures thereof.

15. A polymeric pigment dispersant as set forth in claim 1 wherein said second compound is present in an amount from 35 to 55 parts by weight based on 100 parts by weight of said polymeric pigment dispersant.

16. A polymeric pigment dispersant as set forth in claim 1 wherein said carbamate compound is further defined as an alkyl carbamate having 1 to 20 carbon atoms in the alkyl chain.

17. A polymeric pigment dispersant as set forth in claim 1 wherein said carbamate compound is selected from the group consisting of methyl carbamate, ethyl carbamate, and mixtures thereof.

18. A polymeric pigment dispersant as set forth in claim 1 wherein said carbamate compound is present in an amount from 5 to 30 parts by weight based on 100 parts by weight of said polymeric pigment dispersant.

19. A polymeric pigment dispersant as set forth in claim 1 wherein the molar ratio of said carbamate compound to said first compound is from 1:1 to 10:1.

20. A polymeric pigment dispersant as set forth in claim 1 further comprising the reaction product of an acid compound having at least two hydroxyl groups, wherein said acid compound is reactive with said first compound.

21. A polymeric pigment dispersant as set forth in claim 20 wherein said acid compound is selected from the group consisting of dihydroxy acid compounds, trihydroxy acid compounds, and mixtures thereof.

22. A polymeric pigment dispersant as set forth in claim 20 wherein said acid compound comprises dimethylolpropionic acid.

23. A polymeric pigment dispersant as set forth in claim 20 wherein said acid compound is present in an amount from 5 to 25 parts by weight based on 100 parts by weight of said polymeric pigment dispersant.

24. A polymeric pigment dispersant as set forth in claim 20 wherein said acid compound reacts with said first compound to form a branched compound.

25. A polymeric pigment dispersant as set forth in claim 1 having a molecular weight of 4000 or less.

26. A polymeric pigment dispersion for use in a coating composition, said polymeric pigment dispersion comprising:
   a pigment; and
   a polymeric pigment dispersant comprising the reaction product of;
      a first compound having a plurality of hydroxyl groups,
      a carboxylic acid anhydride,
      a second compound having at least one epoxy group, and
      a carbamate compound.

27. A pigment dispersion as set forth in claim 26 wherein said first compound is selected from the group consisting of erythritol, pentaerythritol, dipentaerythritol, trimethylolethane, trimethylolpropane, dulcitol, threitol, and mixtures thereof.

28. A pigment dispersion as set forth in claim 26 wherein said carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

29. A pigment dispersion as set forth in claim 26 wherein said second compound is selected from the group consisting of glycidylneodecanoate, dodecyl oxide, tetradecyl oxide, octadecyl oxide, and cyclohexene oxide, and mixtures thereof.

30. A pigment dispersion as set forth in claim 26 wherein said carbamate compound is further defined as an alkyl carbamate having 1 to 20 carbon atoms in the alkyl chain.

31. A pigment dispersion as set forth in claim 26 further comprising the reaction product of an acid compound having at least two hydroxyl groups, wherein said acid compound is reactive with said first compound.

32. A pigment dispersion as set forth in claim 31 wherein acid compound is selected from the group consisting of dihydroxy acid compounds, trihydroxy acid compounds, and mixtures thereof.

33. A pigment dispersion as set forth in claim 26 wherein said first compound comprises pentaerythritol, said carboxylic acid anhydride comprises hexahydrophthalic anhydride, said second compound comprises glycidylneodecanoate, and said carbamate compound comprises methyl carbamate.

34. A pigment dispersion as set forth in claim 33 further comprising the reaction product of dimethylolpropionic acid.

35. A pigment dispersion as set forth in claim 26 wherein said pigment comprises phthalocyanine-based green pigment, phthalocyanine-based blue pigment, and mixtures thereof.

36. A pigment dispersion as set forth in claim 26 wherein said pigment is present in an amount from 2 to 30 parts by weight based on 100 parts by weight of said pigment dispersion.

37. A pigment dispersion as set forth in claim 26 wherein said polymeric pigment dispersant is present in an amount from 40 to 80 parts by weight based on 100 parts by weight of said pigment dispersion.

38. A polymeric pigment dispersant for efficient wetting and grinding of a pigment, said polymeric pigment dispersant being of the general formula:

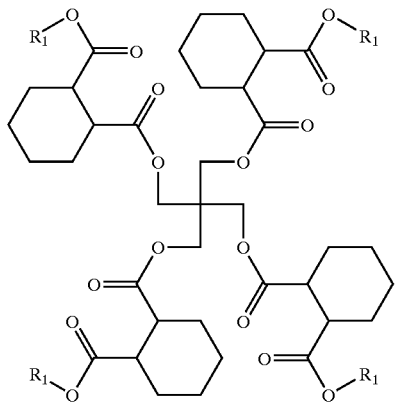

wherein $R_1$ is selected from the group consisting of;

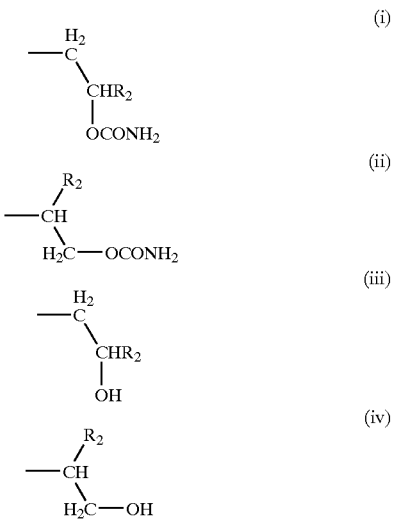

, and mixtures thereof,
wherein $R_2$ is an alkoxy chain having at least one oxygen atom and from 6 to 20 carbon atoms.

39. A method of preparing a polymeric pigment dispersant for efficient wetting and grinding of a pigment, said method comprising the steps of:
   (A) providing a branched compound having a plurality of hydroxyl groups;
   (B) reacting the hydroxyl groups of the branched compound with carboxylic acid anhydride to form a first intermediate compound having a plurality of carboxylic acid groups;
   (C) reacting at least one of the carboxylic acid groups of the first intermediate compound with a second compound having at least one epoxy group to form a second intermediate compound having at least one hydroxyl group; and
   (D) reacting the at least one hydroxyl group of the second intermediate compound with a carbamate compound to prepare the polymeric pigment dispersant.

40. A method as set forth in claim 39 wherein the step of (A) providing the branched compound is further defined as providing a first compound selected from the group consisting of erythritol, pentaerythritol, dipentaerythritol, trimethylolethane, trimethylolpropane, dulcitol, threitol, and mixtures thereof.

41. A method as set forth in claim 39 wherein the step of (A) providing the branched compound is further defined as reacting a first compound selected from the group consisting of erythritol, pentaerythritol, dipentaerythritol, trimethylolethane, trimethylolpropane, dulcitol, threitol, and mixtures thereof, with an acid compound having at least two hydroxyl groups to provide the branched compound having the plurality of hydroxyl groups.

42. A method as set forth in claim 39 wherein the steps of (A) through (D) are conducted at a temperature between 50° C. and 200° C.

43. A method as set forth in claim 39 wherein the step of (B) reacting the hydroxyl groups of the branched compound with carboxylic acid anhydride is further defined as reacting the hydroxyl groups of the branched compound with a carboxylic acid anhydride selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof, to form the first intermediate compound having the plurality of carboxylic acid groups.

44. A method as set forth in claim 39 wherein the step of (C) reacting at least one of the carboxylic acid groups of the first intermediate compound with the second compound having the at least one epoxy group is further defined as reacting at least one of the carboxylic acid groups of the first intermediate compound with a second compound selected from the group consisting of glycidylneodecanoate, dodecyl oxide, tetradecyl oxide, octadecyl oxide, and cyclohexene oxide, and mixtures thereof, to form the second intermediate compound having the at least one hydroxyl group.

45. A method as set forth in claim 39 wherein the step of (D) reacting the at least one hydroxyl group of the second intermediate compound with the carbamate compound is further defined as reacting the at least one hydroxyl group of the second intermediate compound with an alkyl carbamate having from 1 to 20 carbon atoms in the alkyl chain, to prepare the polymeric pigment dispersant.

* * * * *